(12) United States Patent
Nishi et al.

(10) Patent No.: US 9,618,833 B2
(45) Date of Patent: Apr. 11, 2017

(54) IMAGE PROJECTION APPARATUS

(71) Applicants: Yukimi Nishi, Tokyo (JP); Naoyuki Ishikawa, Kanagawa (JP); Satoshi Tsuchiya, Kanagawa (JP); Akihisa Mikawa, Kanagawa (JP); Hideo Kanai, Tokyo (JP); Tetsuya Fujioka, Kanagawa (JP); Masamichi Yamada, Kanagawa (JP); Yasunari Mikutsu, Tokyo (JP); Yoshio Kubo, Tokyo (JP)

(72) Inventors: Yukimi Nishi, Tokyo (JP); Naoyuki Ishikawa, Kanagawa (JP); Satoshi Tsuchiya, Kanagawa (JP); Akihisa Mikawa, Kanagawa (JP); Hideo Kanai, Tokyo (JP); Tetsuya Fujioka, Kanagawa (JP); Masamichi Yamada, Kanagawa (JP); Yasunari Mikutsu, Tokyo (JP); Yoshio Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/626,343

(22) Filed: Feb. 19, 2015

(65) Prior Publication Data

US 2015/0241763 A1    Aug. 27, 2015

(30) Foreign Application Priority Data

Feb. 24, 2014  (JP) .................................. 2014-032651

(51) Int. Cl.
*G09G 5/02*      (2006.01)
*G03B 21/16*     (2006.01)
(Continued)

(52) U.S. Cl.
CPC ......... *G03B 21/16* (2013.01); *G02B 27/0006* (2013.01); *G03B 21/145* (2013.01);
(Continued)

(58) Field of Classification Search
None
See application file for complete search history.

(56) References Cited

U.S. PATENT DOCUMENTS 5,250,799 A * 10/1993 Werner ............. H05B 41/3922
                                                250/214 AL
6,297,859 B1 * 10/2001 George ................... H04N 9/28
                                                    348/189

(Continued)

FOREIGN PATENT DOCUMENTS

JP    2001-092014    4/2001
JP    2001-305650    11/2001

*Primary Examiner* — Frank Chen
(74) *Attorney, Agent, or Firm* — Oblon, McClelland, Maier & Neustadt, L.L.P.

(57) ABSTRACT

An image projection apparatus including a light source, a projection unit to project light from the light source, a dust-proof member to protect the projection unit from outside dust and through which light from the light source passes, a light detector provided at an end surface of the dust-proof member to detect reflected light of light projected from the projection unit, the reflected light being internally reflected light trapped within the dust-proof member, and a controller that executes a protective action when the amount of internally reflected light detected by the light detector meets or exceeds a predetermined threshold value.

11 Claims, 6 Drawing Sheets

(51) Int. Cl.
*G03B 21/14* (2006.01)
*G03B 31/00* (2006.01)
*G02B 27/00* (2006.01)
*H04N 9/31* (2006.01)
*G03B 21/20* (2006.01)

(52) U.S. Cl.
CPC ..... *G03B 21/2053* (2013.01); *G03B 21/2086* (2013.01); *G03B 31/00* (2013.01); *H04N 9/3155* (2013.01); *H04N 9/3194* (2013.01); *G03B 21/2066* (2013.01)

(56) References Cited

U.S. PATENT DOCUMENTS

| | | | | |
|---|---|---|---|---|
| 6,570,621 | B2* | 5/2003 | Bigler | H04N 5/2254 348/333.13 |
| 7,210,791 | B2* | 5/2007 | Vinson | G03B 21/142 353/52 |
| 7,273,283 | B2* | 9/2007 | Tsai | G03B 21/18 353/52 |
| 7,705,960 | B2* | 4/2010 | Shimizu | G02F 1/133308 349/158 |
| 2003/0047669 | A1* | 3/2003 | Hirano | B65H 7/14 250/214 R |
| 2012/0257172 | A1* | 10/2012 | Shirakura | G03B 21/16 353/61 |
| 2013/0128233 | A1 | 5/2013 | Sato | |
| 2015/0002720 | A1* | 1/2015 | Mankowski | H04N 5/23216 348/333.02 |

\* cited by examiner

IMAGE PROJECTION APPARATUS

CROSS-REFERENCE TO RELATED APPLICATION

This patent application is based on and claims priority pursuant to 35 U.S.C. §119 from Japanese Patent Application No. 2014-032651, filed on Feb. 24, 2014 in the Japan Patent Office, which is hereby incorporated by reference herein in its entirety.

BACKGROUND

Technical Field

Exemplary embodiments of the present disclosure generally relate to an image projection apparatus.

Description of the Related Art

Image projection apparatuses such as projectors are widely known. Cost reduction of such image projection apparatuses is progressing due to recent advancements in resolution (i.e., higher resolution) of liquid crystal panels and recent advancements in brightness (i.e., improved brightness) of light sources (e.g., lamp) accompanying advancement in efficiency. Small and light-weight image projection apparatuses using a digital micro-mirror device (hereinafter referred to as DMD) are in widespread use in offices and schools. They are also becoming widely prevalent in homes.

With respect to such image projection apparatuses that project an enlarged projection image on a projection plane such as a screen using a projection lens, an intense light is outputted from a light emission portion of the image projection apparatuses. Looking into the light emission portion from the screen side is hazardous and may result in damaging one's eyes. Thus, warning labels and instructions, such as to prevent looking into the light emission portion, accompany the image projection apparatuses.

In a case in which an object (i.e., obstruction) such as a pocketbook or a document is placed in front of a light emission portion of an image projection apparatus with the objective of blocking emitted light, heat from emitted light accumulates between the obstruction and the image projection apparatus. Accordingly, excessive temperature rise of the image projection apparatus, particularly around a projection lens, occurs. Excessive temperature rise of the image projection apparatus may lead to malfunction of the image projection apparatus. In addition, the obstruction is also heated, sometimes to a dangerous degree. This excessive temperature rise and heating of the obstruction are thus undesirable.

Figure 14:
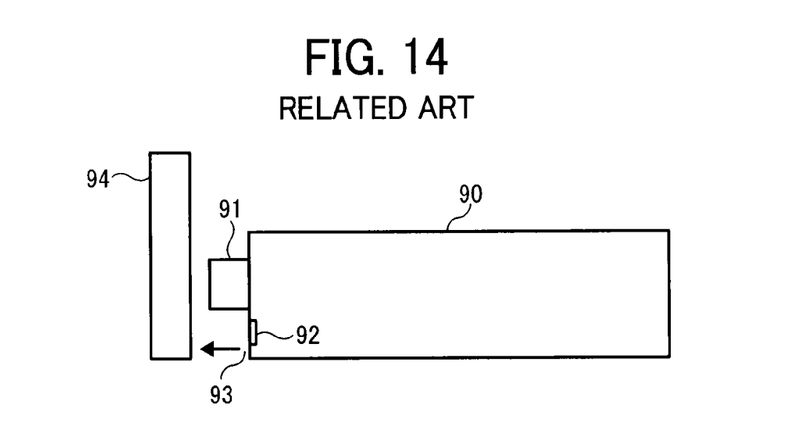
FIG. 14 is a schematic diagram of an example of a conventional projector.

An example of a conventional projector is shown in FIG. 14. In the example, malfunction due to an obstruction 94 is prevented by discharging air (i.e., air current 93) used to cool the inside of a projector body 90 from a side of the projector body 90 that includes a projection lens 91, and by controlling output of a lamp of the conventional projector based upon a detection value detected with a sensor 92. The sensor 92 detects changes in air pressure of the air current 93 influenced by the obstruction 94 placed in front of the projection lens 91.

However, changes in air pressure of the air current 93 are not only induced by the obstruction 94. Room environment in which the conventional projector is set also influences air pressure. Air pressure of the air current 93 detected by the sensor 92 changes from moment to moment. Thus, there is an issue of accuracy with respect to controlling output of the lamp based upon the air current 93 discharged from the conventional projector.

In a well-known conventional horizontal-type image projection apparatus, a projection lens is provided at a side surface of a housing of the conventional horizontal-type image projection apparatus. The conventional horizontal-type image projection apparatus is capable of projecting in a so-called "tilt projection" manner onto a screen. Thus, even if an obstruction such as a notebook or a pocketbook is placed in front of the projection lens, there is a space between the obstruction and the projection lens. Accordingly, the above-described excessive temperature rise does not easily occur with respect to the conventional horizontal-type image projection apparatus. Nevertheless, excessive temperature rise of the conventional horizontal-type image projection apparatus may occur depending on a distance between the obstruction and the projection lens.

By contrast, in an upright-type image projection apparatus, a projection unit that emits light from a projection lens is provided at an upper surface side of a housing of the upright-arranged image projection apparatus. To block emitted light, an obstruction such as a sheet or a stack paper must be placed on an upper surface of the housing. Thus, the obstruction easily adheres to the projection unit and there is no space in between the obstruction and the projection unit. Accordingly, heat from emitted light accumulates between the obstruction and the projection unit, and excessive temperature rise of the upright-type image projection apparatus easily occurs. In addition, the obstruction is heated. When space between the obstruction and the projection unit is insufficient as in the above-described upright-type image projection apparatus, adopting a configuration of the above-described conventional projector that detects air pressure is not possible.

SUMMARY

In view of the foregoing, in an aspect of this disclosure, there is provided a novel image projection apparatus including a light source, a projection unit to project light from the light source, a dust-proof member to protect the projection unit from outside dust and through which light from the light source passes, a light detector provided at an end surface of the dust-proof member to detect reflected light of light projected from the projection unit, the reflected light being internally reflected light trapped within the dust-proof member, and a controller that executes a protective action when the amount of internally reflected light detected by the light detector meets or exceeds a predetermined threshold value.

These and other aspects, features, and advantages will be more fully apparent from the following detailed description of illustrative embodiments, the accompanying drawings, and associated claims.

BRIEF DESCRIPTION OF THE DRAWINGS

The aforementioned and other aspects, features, and advantages of the present disclosure will be better understood by reference to the following detailed description when considered in connection with the accompanying drawings, wherein.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

Hereinafter, exemplary embodiments of the present invention are described in detail with reference to the drawings. However, the present invention is not limited to the exemplary embodiments described below, but may be modified and improved within the scope of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

In a later-described comparative example, illustrative embodiment, and alternative example, for the sake of simplicity, the same reference numerals will be given to constituent elements such as parts and materials having the same functions, and redundant descriptions thereof omitted.

There is provided a novel image projection apparatus that accurately detects the presence of an obstruction at a projecting direction of a projection unit that projects light.

The following is a detailed description of exemplary embodiments of the present invention with reference to the drawings of FIG. 1 to FIG. 13.

An image projection apparatus according to an embodiment of the present invention includes a light source (e.g., lamp L), a projection unit (e.g., projection unit 5) to project light from the light source, a dust-proof member (e.g., dust-proof glass panel 8) to protect the projection unit from outside dust, and a light detector (e.g., illuminance sensor 4) provided at an end surface of the dust-proof member. The light detector detects reflected light of light projected from the projection unit. More specifically, the light detector detects internally reflected light (e.g., internally reflected light L3) that is reflected light within the dust-proof member formed from a portion of light reflected by the obstruction (e.g., obstruction 30). The examples indicated in parentheses correspond to labels and numbers of exemplary embodiments of the present invention described below.

[Detection of Obstruction]

Figure 1:
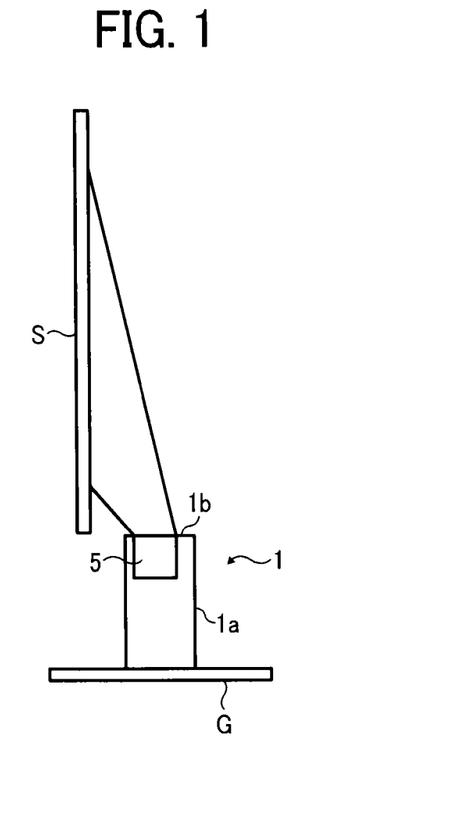
FIG. 1 is a schematic diagram of an image projection apparatus according to an embodiment of the present invention projecting an image to a screen.

FIG. 1 is a schematic diagram of an image projection apparatus 1 according to an embodiment of the present invention projecting an image to a screen S. The image projection apparatus 1 includes a housing 1a, and the projection unit 5 to project light provided at an upper surface side of the housing 1a. The image projection apparatus 1 projects, from a bottom side with respect to the screen S, light of the image to the screen S. The image projection apparatus 1 is an upright-type image projection apparatus in which the projection unit 5 is provided at the upper surface side of the housing 1a, and has an upper surface 1b that is level with respect to a surface G on which the image projection apparatus 1 is set. It is to be noted that the upper surface 1b may be sloping or level with respect to the surface G. Compared to a conventional horizontal-type image projection apparatus, space necessary for setting the image projection apparatus 1 is smaller, and distance between the image projection apparatus 1 and the screen S is shorter. Thus, the image projection apparatus 1 is particularly suited for use in small rooms.

Figure 2:
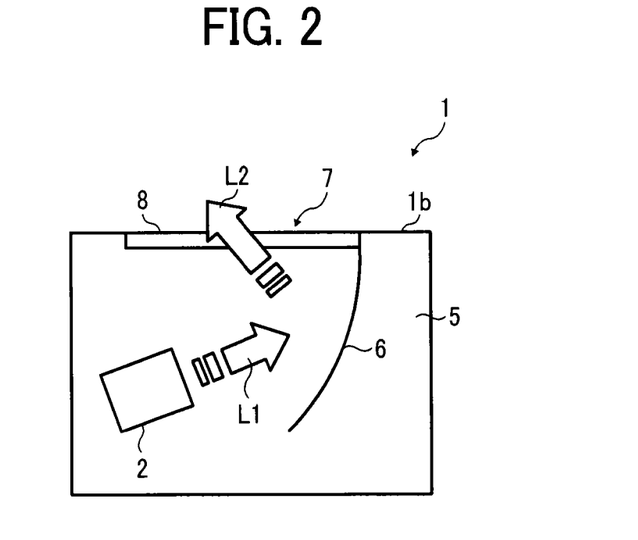
FIG. 2 is a schematic diagram of an example of a configuration of a projection unit of the image projection apparatus.
Figure 3:
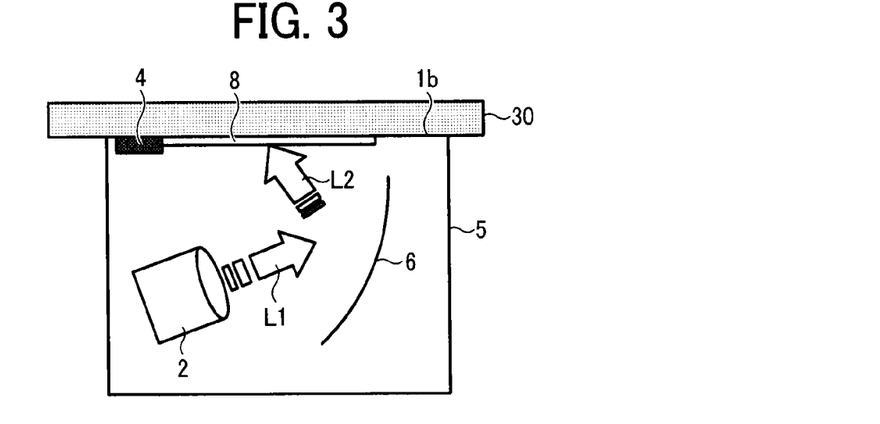
FIG. 3 is a schematic diagram of an obstruction placed on an upper surface of the projection unit of FIG. 2.

FIG. 2 is a schematic diagram of an example of a configuration of the projection unit 5 of the image projection apparatus 1. FIG. 3 is a schematic diagram of an obstruction 30 placed on the upper surface 1b of the projection unit 5 of FIG. 2. As shown in FIG. 2, the projection unit 5 includes a projection lens 2, a reflecting mirror 6, and an opening 7 provided at the upper surface 1b of the image projection apparatus 1. Emitted light L1 from the projection lens 2 is reflected by the reflecting mirror 6 and emitted from the opening 7 as reflected light L2. With the above-described configuration, a length of a light path from the projection lens 2 to the screen S is lengthened. Accordingly, magnification ratio of the image that is projected is increased. It is to be noted that in accordance with a configuration of an employed optical system, a concave mirror, a convex mirror, or the like may be employed as the reflecting mirror 6.

Dust or foreign particles might enter the housing 1a of the image projection apparatus 1 from the opening 7 and adhere to components such as the reflecting mirror 6, if the opening 7 is left open to the environment. Thus, the dust-proof glass panel 8 serving as the dust-proof member is provided at the opening 7 to protect the projection unit 5 from outside dust.

Figure 4:
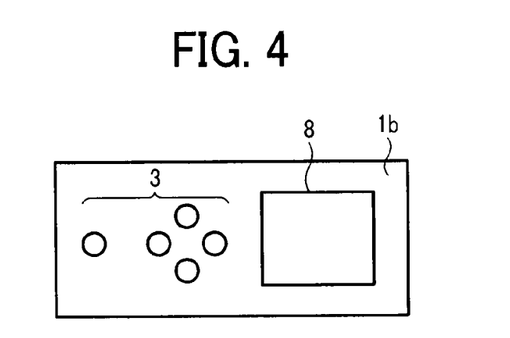
FIG. 4 is a top view of the image projection apparatus.

FIG. 4 is a top view of the image projection apparatus 1. As shown in FIG. 4, the upper surface 1b of the housing 1a includes the dust-proof glass panel 8 of the projection unit 5 and a control panel 3 to conduct various operations with respect to the image projection apparatus 1. The upper surface 1b is level with respect to the surface G. Thus, placement of the obstruction 30 is likely to be on the dust-proof glass panel 8 of the upper surface 1b of the housing 1a as shown in FIG. 3. When the obstruction 30 is placed on the dust-proof glass panel 8, it is conceivable that the obstruction 30 is placed on the dust-proof glass panel 8 in such a manner as to avoid placing the obstruction 30 over the control panel 3. The obstruction 30 may be, for example, a notebook, a pocketbook, a book, a document, or the like.

As shown in FIG. 3, when the obstruction 30 is placed on the dust-proof glass panel 8, the reflected light L2 that passes through the dust-proof glass panel 8 is blocked from being emitted from the projection unit 5. The reflected light L2 is reflected by the obstruction 30 to the housing 1a side. Accordingly, heat accumulates between the obstruction 30 and the image projection apparatus 1, and excessive temperature rise of the image projection apparatus 1 occurs. In addition, the obstruction 30 is heated by heat from the reflected light L2 of the projection unit 5.

The image projection apparatus 1 according to an embodiment of the present invention further includes the illuminance sensor 4 serving as a light detector to obtain luminous energy, e.g. a light quantity value. The illuminance sensor 4 is provided at the end surface of the dust-proof glass panel 8. With the illuminance sensor 4, detection of the obstruction 30 is undertaken and a predetermined protective action (detailed description of the predetermined protective action is described later) is undertaken as a result.

Figure 5:
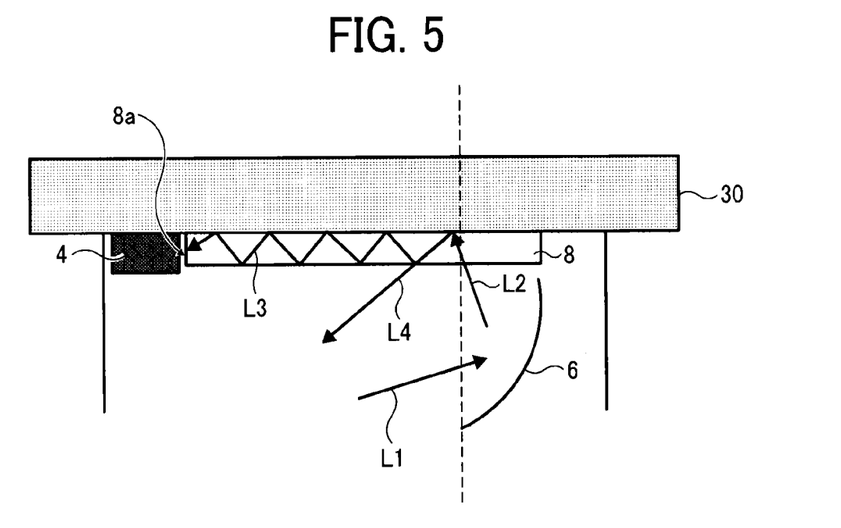
FIG. 5 is an enlarged view of an illuminance sensor provided at an end surface of a dust-proof glass panel of the image projection apparatus.
Figure 6:
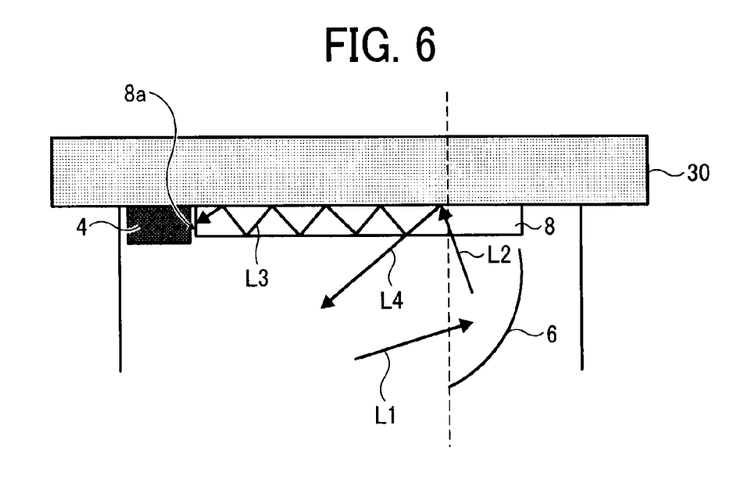
FIG. 6 is an enlarged view of the illuminance sensor provided at the end surface of the dust-proof glass panel of the image projection apparatus.

FIG. 5 and FIG. 6 are enlarged views of the illuminance sensor 4 provided at the end surface of the dust-proof glass panel 8 of the image projection apparatus 1. FIG. 8 to FIG. 11 are top views of the dust-proof glass panel 8, without the obstruction 30, of other dispositions of the illuminance sensor 4.

As shown in FIG. 5 and FIG. 6, the illuminance sensor 4 is provided at the end surface, specifically, in the present embodiment, a left end surface 8a in the drawings, of the dust-proof glass panel 8. It is preferable that the illuminance sensor 4 is provided at a position, as shown in FIG. 5 and FIG. 6, in which a normal line (i.e., dotted line in FIG. 5 and FIG. 6) of the reflected light L2 is between the illuminance sensor 4 and the reflecting mirror 6 that is a reflecting position of the reflected light L2.

When the obstruction 30 is placed on the dust-proof glass panel 8, the reflected light L2 that passes through the dust-proof glass panel 8 is blocked by the obstruction 30 and is reflected to the housing 1a side. As shown in FIG. 5 and FIG. 6, a portion of light reflected from the obstruction 30 passes through the dust-proof glass panel 8 and into the projection unit 5, while a portion of light reflected from the obstruction 30 is reflected at an interface of the dust-proof glass panel 8 and trapped within the dust-proof glass panel 8. In the exemplary embodiment, the portion of light reflected from the obstruction 30 that passes through the dust-proof glass panel 8 is designated reflected light L4, and the portion of light reflected from the obstruction 30 that is trapped and repeatedly reflected within the dust-proof glass panel 8 is designated internally reflected light L3.

The following is an example of a transmittance (T) of the employed dust-proof glass panel 8. More specifically, these are examples of the transmittance (T) of a front surface of a region of the dust-proof glass panel 8 that is optically effective.
Incidence angle 45°/Wavelength 430-680 nm: T≥96%
Incidence angle 70°/Wavelength 430-625 nm: T≥80%
Incidence angle 70°/Wavelength 625-680 nm: T≥78%

By providing the illuminance sensor 4 at the end surface of the dust-proof glass panel 8, the internally reflected light L3 is detected. More specifically, the luminous energy, at the position in which the illuminance sensor 4 is provided, is obtained. When the obstruction 30 is placed on the dust-proof glass panel 8, the luminous energy obtained by the illuminance sensor 4 is larger than the luminous energy in normal use. When the luminous energy obtained by the illuminance sensor 4 is a predetermined value or more, it is interpreted as the projection unit 5 being blocked. When it is determined that the projection unit 5 is being blocked, the predetermined protective action noted previously is undertaken. It is to be noted that the obstruction 30 may not be necessarily placed on the dust-proof glass panel 8; the luminous energy obtained with the illuminance sensor 4 increases even in cases in which a distance between the obstruction 30 and the dust-proof glass panel 8 is small. Thus, the obstruction 30 may be detected in cases in which the distance between the obstruction 30 and the dust-proof glass panel 8 is small.

Figure 7:
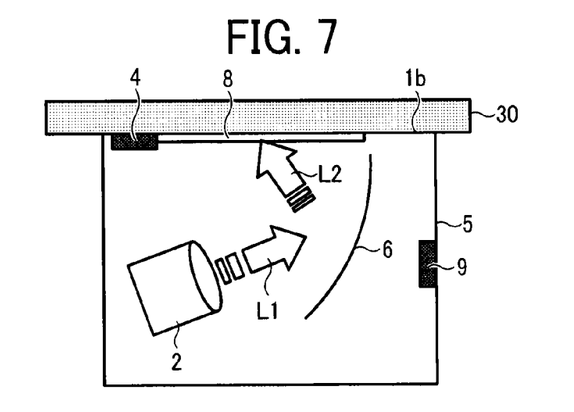
FIG. 7 is a schematic diagram of the image projection apparatus further including an outside illuminance sensor.

FIG. 7 is a schematic diagram of the image projection apparatus 1 further including an outside illuminance sensor 9. As shown in FIG. 7, it is preferable to detect outside luminous energy, e.g., an outside light quantity, with the outside illuminance sensor 9 that is not influenced by the obstruction 30 placed on the dust-proof glass panel 8. In FIG. 7, the outside illuminance sensor 9 is provided within the projection unit 5. However, the outside illuminance sensor 9 may be provided at any place in the image projection apparatus 1 as long as outside light may be detected.

It is to be noted that the reflection of light by the obstruction 30 is diffused reflection. Accordingly, the internally reflected light L3 within the dust-proof glass panel 8 may be detected at any end surface of the dust-proof glass panel 8. In the above-described exemplary embodiment shown in FIG. 5 and FIG. 6, one illuminance sensor 4 is provided at the end surface, specifically the left end surface 8a in the drawings, of the dust-proof glass panel 8. However, arrangement of the illuminance sensor 4 is not limited to the above-described exemplary embodiment. Further, the employed number of illuminance sensors 4 is not limited to the above-described exemplary embodiment. The following are descriptions of other preferable arrangements of the illuminance sensor 4 with reference to FIG. 8 to FIG. 11.

Figure 8:
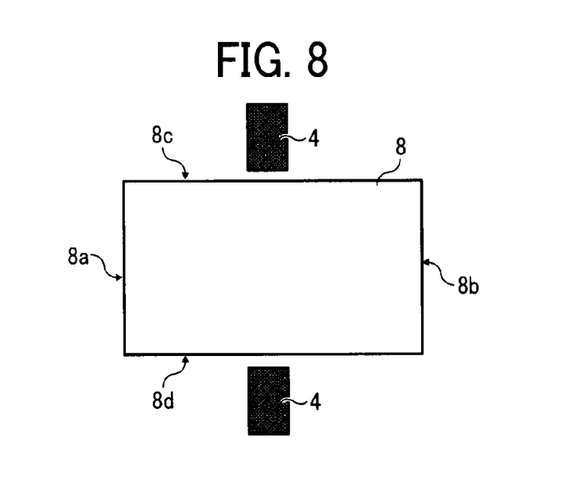
FIG. 8 is a top view of the dust-proof glass panel of an exemplary embodiment of the present invention employing two illuminance sensors.

FIG. 8 is a top view of the dust-proof glass panel 8 of an exemplary embodiment of the present invention employing two illuminance sensors 4. As shown in FIG. 8, one of the two illuminance sensors 4 is provided at an end surface 8d and the other is provided at an end surface 8c opposite the end surface 8d. By increasing the number of the illuminance sensors 4, precision of detecting the internally reflected light L3 within the dust-proof glass panel 8 is enhanced.

Figure 9:
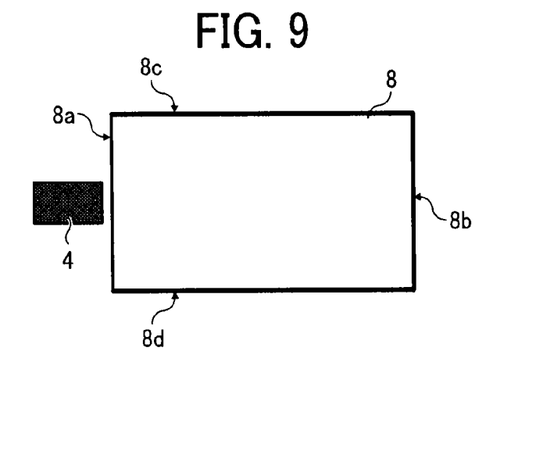
FIG. 9 is a top view of the dust-proof glass panel of an exemplary embodiment of the present invention in which three end surfaces are mirrors.

FIG. 9 is a top view of the dust-proof glass panel 8 of an exemplary embodiment of the present invention in which end surfaces 8b, 8c, and 8d are mirrors (i.e., total reflecting mirrors, represented as bold lines in FIG. 9) and the end surface 8a provided with the illuminance sensor 4 is not a mirror. With the configuration of FIG. 9, detection of the internally reflected light L3 within the dust-proof glass panel 8 is more accurate. More specifically, for example, when the end surface 8b, opposite the end surface 8a provided with the illuminance sensor 4, is a mirror, precision of detecting the internally reflected light L3 within the dust-proof glass panel 8 is enhanced. Further, when the other end surfaces 8c and 8d are also mirrors, precision of detecting the internally reflected light L3 within the dust-proof glass panel 8 is further enhanced.

Figure 10:
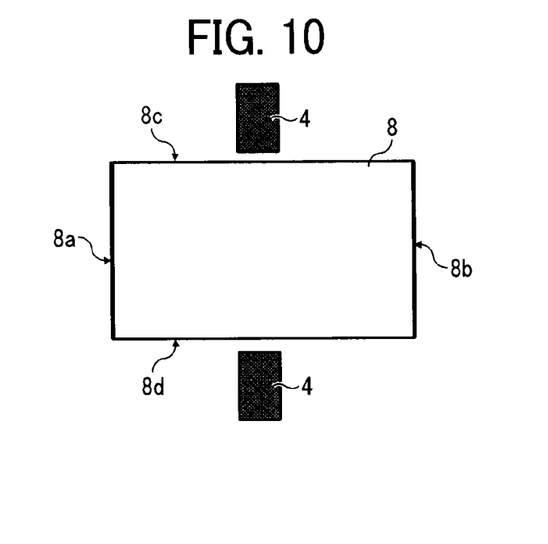
FIG. 10 is a top view of the dust-proof glass panel of an exemplary embodiment of the present invention in which two end surfaces are mirrors, and two illuminance sensors are employed.

FIG. 10 is a top view of the dust-proof glass panel 8 of an exemplary embodiment of the present invention in which the end surfaces 8a and 8b are mirrors, and two illuminance sensors 4 are employed as shown in FIG. 8.

Figure 11:
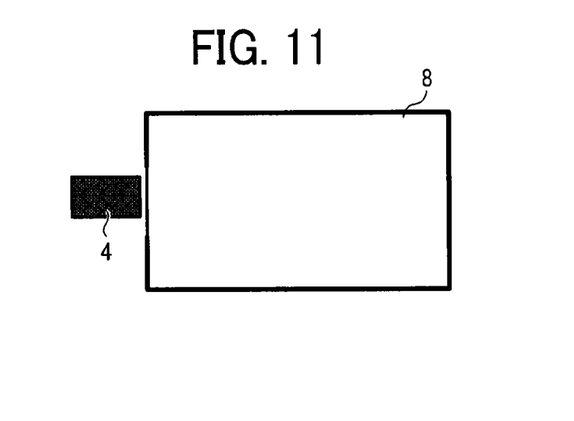
FIG. 11 is a top view of the dust-proof glass panel of an exemplary embodiment of the present invention in which end surfaces other than a portion of an end surface corresponding to a light receiving scope of the illuminance sensor are mirrors.

FIG. 11 is a top view of the dust-proof glass panel 8 of an exemplary embodiment of the present invention in which end surfaces other than a portion of an end surface corresponding to a light receiving scope of the illuminance sensor 4 are mirrors. With the configuration of FIG. 11, precision of detecting the internally reflected light L3 within the dust-proof glass panel 8 is enhanced without increasing the number of the illuminance sensors 4.

[Configuration of Image Projection Apparatus]

Figure 12:
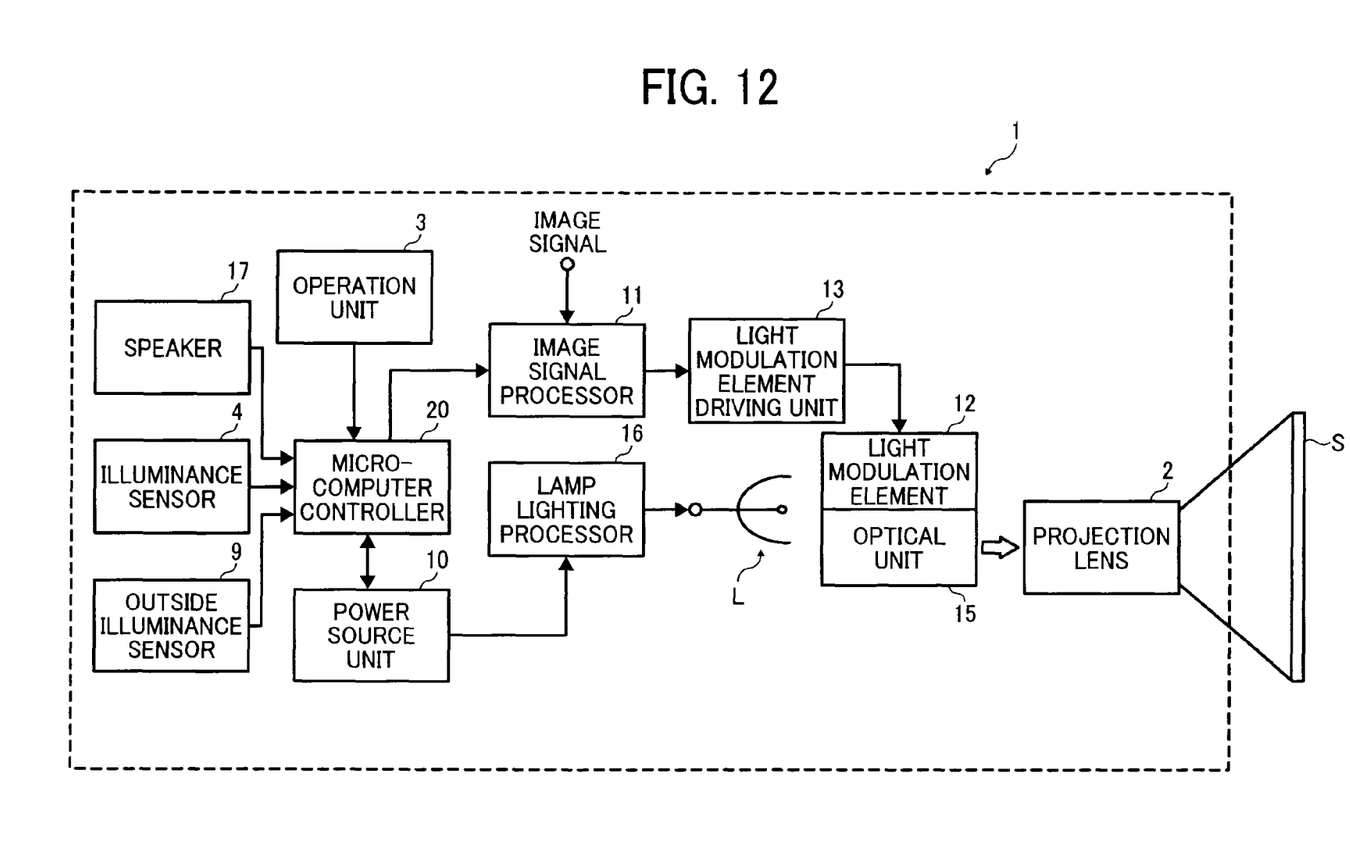
FIG. 12 is a block diagram of an example of a configuration of the image projection apparatus according to an embodiment of the present invention.

FIG. 12 is a block diagram of an example of a configuration of the image projection apparatus 1 according to an embodiment of the present invention. The image projection apparatus 1 includes a power source unit 10; the lamp L as the light source; the projection lens 2; an image signal processor 11 serving as a signal processor; a light modulation element 12 and a light modulation element driving unit 13 serving as a modulating device; an optical unit 15; a lamp lighting processor 16; a micro-computer controller 20 serving as a controller; the control panel 3; the illuminance sensor 4; the outside illuminance sensor 9 serving as an outside light detector; and a speaker 17 serving as an audio output device.

The projection lens 2 emits light from the lamp L towards the screen S. More specifically, the projection lens 2 forms an enlarged projection image on the screen S based on light, from the optical unit 15, including image signals modulated by the light modulation element 12.

The image signal processor 11 conducts, for example, analog/digital (A/D) conversion and angle-of-view conversion with respect to color image signals inputted from an external terminal such as a personal computer that is connected via an input-output interface (I/F), not shown in FIG. 12, of the image projection apparatus 1.

The light modulation element 12 displays, such as on a liquid crystal panel, the projection image processed by the image signal processor 11, modulates light from the light source L in accordance with the displayed projection image, and supplies the projection image to the projection lens 2. The light modulation element 12 may be, for example, a transmissive liquid crystal panel.

The light modulation element driving unit 13 converts the color image signals to a format of the light modulation element 12 and supplies the converted color image signals to the light modulation element 12. The optical unit 15 guides light from the lamp L towards the light modulation element 12. The lamp lighting processor 16 controls switching on and off of the lamp L.

The micro-computer controller 20 (hereinafter also referred to as controller 20) of the image projection apparatus 1 controls the image signal processor 11, the lamp lighting processor 16, and the like. Further, the micro-computer controller 20 undertakes the predetermined protective action when the obstruction 30 is detected by the illuminance sensor 4. The micro-computer controller 20 includes a central processing unit (CPU), a random access memory (RAM), and a read-only memory (ROM). The micro-computer controller 20 conducts various controls of the image projection apparatus 1 by reading out programs stored in the ROM to the RAM and executing the programs.

The control panel 3 is an interface for inputting commands to the micro-computer controller 20.

As described above, the illuminance sensor 4 detects placement of the obstruction 30 on the upper surface 1b of the image projection apparatus 1 or placement of the obstruction 30 adjacent to the projection unit 5 by detecting light reflected from the obstruction 30 and obtaining the luminous energy. When the illuminance sensor 4 detects light reflected from the obstruction 30 placed on the upper surface 1b of the housing 1a or placed adjacent to the projection unit 5, the illuminance sensor 4 inputs a detection signal, according to an amount of the luminous energy, to the micro-computer controller 20. Accordingly, the presence of the obstruction 30 is communicated to the micro-computer controller 20.

The outside illuminance sensor 9 detects light outside of the image projection apparatus 1. The outside illuminance sensor 9 outputs a detection signal, according to outside luminous energy, to the micro-computer controller 20, which then causes the speaker 17 to issue a predetermined warning.

[Control by Image Projection Apparatus]

The following is a description of a process executed by the image projection apparatus 1 according to an embodiment of the present invention. More specifically, the following is a description of detecting the obstruction 30 and starting the predetermined protective action.

Figure 13:
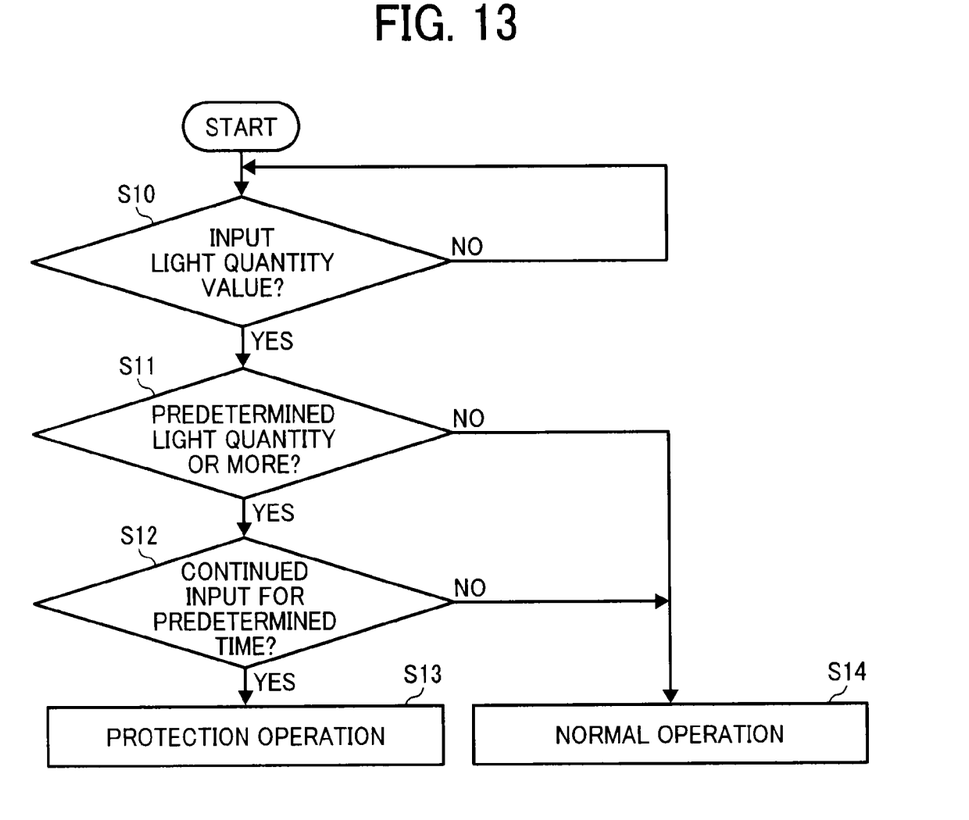
FIG. 13 is a flowchart describing control by a microcomputer controller with respect to detection of the obstruction and determination of execution of a predetermined protective action.

FIG. 13 is a flowchart describing control by the micro-computer controller 20 with respect to detection of the obstruction 30 and determination of execution of the predetermined protective action.

In a first step S10, detection of input of the detection signal, according to the amount of the luminous energy, from the illuminance sensor 4 is conducted by the micro-computer controller 20. When the first step S10 is YES, the micro-computer controller 20 determines whether the luminous energy (i.e., brightness) indicated by the detection signal meets or exceeds a predetermined threshold value in a second step S11.

When brightness is the predetermined threshold value or more, corresponding to YES in the second step S11, the micro-computer controller 20 determines whether the detection signal from the illuminance sensor 4 is continuously inputted over a predetermined time period in a third step S12.

When input of the detection signal is determined to be continuously inputted over the predetermined time period, corresponding to YES in the third step S12, it is interpreted as there exists an obstruction such as the obstruction 30 placed on the upper surface 1b of the housing 1a. Accordingly, the micro-computer controller 20 starts the predetermined protective action indicated as a fourth step S13.

By contrast, when brightness is less than the predetermined threshold value, corresponding to NO in the second step 11, the micro-computer controller 20 continues normal operation indicated as a fifth step S14. Further, when brightness is the predetermined threshold value or more, corresponding to YES in the second step S11, and the detection signal is not continuously inputted over the predetermined time period, corresponding to NO in the third step S12, the micro-computer controller 20 continues normal operation indicated as the fifth step S14. When the detection signal is not continuously inputted, it is interpreted as there is no obstruction 30.

As described above, items to determine whether or not to start the predetermined protective action are the luminous energy (i.e., brightness) input from the illuminance sensor 4 and the duration (i.e., continuous input time) of the detection signal.

[Protective Action]

Next is a description of examples of the predetermined protective action, indicated as the fourth step S13, when the obstruction 30 is detected. The predetermined protective action includes controlling, with the micro-computer controller 20, the image signal processor 11 to cause the light modulation element 12 to display a black image and limiting an amount of light emitted from the projection lens 2.

More specifically, when expressing black in the image projection apparatus 1, the light modulation element driving unit 13 controls liquid crystal elements in the liquid crystal panel serving as the light modulation element 12 so that light does not pass through the liquid crystal panel. Accordingly, by making all of the liquid crystal panel black, the amount of light emitted from the image projection apparatus 1 is limited. Thus, by limiting the emitted amount of light, heat accumulation between the obstruction 30 and the image projection apparatus 1 is suppressed. Accordingly, excessive temperature rise of the image projection apparatus 1 is suppressed. In addition, heating of the obstruction 30 is prevented.

Another example of the predetermined protective action may be controlling the lamp lighting processor 16 to switch off the lamp L and stopping the image projection apparatus 1. By switching off the lamp L, heat accumulation between the obstruction 30 and the image projection apparatus 1 is suppressed. Accordingly, excessive temperature rise of the image projection apparatus 1 is suppressed. In addition, heating of the obstruction 30 is prevented.

Another example of the predetermined protective action may be controlling the lamp lighting processor 16 to make power (used power) of the lamp L a predetermined value or less. Accordingly, heat accumulation between the obstruction 30 and the image projection apparatus 1 is suppressed. Thus, excessive temperature rise of the image projection apparatus 1 is suppressed. In addition, heating of the obstruction 30 is prevented.

Another example of the predetermined protective action may be further including a piezoelectric buzzer in the image projection apparatus 1 and controlling the piezoelectric buzzer to issue/sound an alert sound or to issue/sound the predetermined alert message from the speaker 17. The predetermined alert message may inform a user to stop the operation of the image projection apparatus 1 or remove the obstruction 30.

Another example of the predetermined protective action may be a combination of the above-described examples of the predetermined protective action.

[Luminous Energy to Determine Presence/Absence of Obstruction]

The predetermined threshold value of the luminous energy in the second step S11 to determine presence/absence of the obstruction 30 may be a constant value or a variable value determined from an operation state factor of the image projection apparatus 1. Specific examples of the operation state factors of the image projection apparatus 1 include, but are not limited to, an operation capability of the lamp L; operation time; color, shade of the projection image; and presence/absence of outside light.

For example, with respect to the above-described exemplary embodiment in which, apart from the illuminance sensor 4, the outside illuminance sensor 9 to detect the outside luminous energy is further provided in the image projection apparatus 1, it is preferable that the micro-computer controller 20 changes the predetermined threshold value according to the outside luminous energy, i.e. intensity of outside light, detected by the outside illuminance sensor 9.

It is to be noted that in the above-described exemplary embodiment, outside light refers to light of a room in which the image projection apparatus 1 is set. Regarding the outside illuminance sensor 9 in the above-described exemplary embodiment, the outside illuminance sensor 9 is preferably provided at a surface of the image projection apparatus 1 opposite the projection lens 2 or provided at a surface of the image projection apparatus 1 opposite the end surface at which the illuminance sensor 4 is provided. This is to prevent the illuminance sensor 9 from receiving light reflected from the obstruction 30.

When the amount of the outside luminous energy detected by the outside illuminance sensor 9 is large (e.g., light within the room is bright), influence of light reflected from the obstruction 30 with respect to the illuminance sensor 4 is relatively small. Accordingly, the predetermined threshold value of the luminous energy of the illuminance sensor 4 may be set high. When the amount of the outside luminous energy detected by the outside illuminance sensor 9 is small (e.g., light within the room is dark), influence of light reflected from the obstruction 30 with respect to the illuminance sensor 4 is significant. Accordingly, the predetermined threshold value of the luminous energy of the illuminance sensor 4 may be set low.

When the lamp L is used for a long time period or the power of the lamp L is high, a temperature of the inside of the housing 1a of the image projection apparatus 1 and a temperature of the lamp L increase. Thus, it is preferable that a timer serving as a time keeping unit to measure time of use of the lamp L is included in the image projection apparatus 1. Preferably, the predetermined threshold value of the luminous energy to determine presence/absence of the obstruction 30 is changed according to time of use of the lamp L measured by the timer. It is also preferable that the predetermined threshold value of the luminous energy to determine presence/absence of the obstruction 30 is changed according to power of the lamp L.

In other words, setting the predetermined threshold value of the luminous energy of the illuminance sensor 4 low enables easier shifting to the predetermined protective action.

In the above-described exemplary embodiment, it is preferable that the continuous input time (i.e., duration) of the detection signal in the third step S12 of FIG. 13 is set short.

The amount of light emitted from the projection lens 2 changes according to color or shade of the projection image. A bright color or a dark color makes the amount of light emitted from the projection lens 2 large. In a case of a projection image with bright colors or dark colors, an amount of heat at the projection lens 2 increases. Accordingly, the inside of the housing 1a of the image projection apparatus 1 and a temperature of the lamp L also increases. Thus, it is also preferable that the predetermined threshold value of the luminous energy to determine presence/absence of the obstruction 30 is changed according to properties (e.g., color, shade) of the projection image projected from the projection lens 2. In other words, setting the predetermined threshold value of the luminous energy of the illuminance sensor 4 low enables easier shifting to the predetermined protective action.

A combination of the above-described preferences may also be employed with respect to changing the threshold value.

In view of the foregoing, the image projection apparatus 1 according to an embodiment of the present invention accurately detects the presence of the obstruction 30 at the projecting direction of the projection unit 5 that projects light by including the illuminance sensor 4 at the end surface of the dust-proof glass panel 8 of the projection unit 5 of the image projection apparatus 1. More specifically, when the obstruction 30 is present on the light path of the projection unit 5 that projects light, projected light is reflected by the obstruction 30. The reflection of light by the obstruction 30 is diffused reflection. The portion of light reflected from the obstruction 30 that is trapped within the dust-proof glass panel 8 is emitted from the end surface of the dust-proof glass panel 8 and is detected by the illuminance sensor 4.

When the luminous energy obtained by the illuminance sensor 4 is the predetermined value or more, it is interpreted as there exists the obstruction 30. By executing the predetermined protective action, heat accumulation between the obstruction 30 and the image projection apparatus 1 is suppressed. Accordingly, excessive temperature rise of the image projection apparatus 1 is suppressed. Thus, possible malfunction of the image projection apparatus 1 due to excessive temperature rise of the image projection apparatus 1 is prevented beforehand. In addition, heating of the obstruction 30 is prevented.

The above-described exemplary embodiments of the present invention are preferable exemplary embodiments. However, the present invention is not limited to the above-described exemplary embodiments, but may be modified and improved within the scope of the present disclosure. Although the above-described exemplary embodiments involve upright-type image projection apparatuses, the present invention may naturally be applied to a horizontal-type image projection apparatus.

What is claimed is:

1. An image projection apparatus, comprising:
   a light source;
   a projector to project light from the light source;
   a dust-proof member to protect the projector from outside dust while transmitting the light from the light source through the dust-proof member;
   a light detector provided at an end surface of the dust-proof member to detect reflected light of light projected from the projector, the reflected light being internally reflected light trapped within the dust-proof member; and
   a controller that executes a protective action when the amount of internally reflected light detected by the light detector meets or exceeds a predetermined threshold value,
   wherein the controller changes the predetermined threshold value based on at least one of (1) a length of a one-time continuous use of the light source and (2) a power level being used by the light source.

2. The image projection apparatus of claim 1, wherein the light detector includes a plurality of light detectors provided, respectively, at a plurality of end surfaces of the dust-proof member to detect reflected light of light projected from the projector.

3. The image projection apparatus of claim 1, wherein a plurality of the end surfaces of the dust-proof member, except for one of the end surface of the dust-proof member provided with the light detector and a portion of the end surface of the dust-proof member corresponding to a light receiving scope of the light detector, are mirrors.

4. The image projection apparatus of claim 1, further comprising:
   a signal processor to process signals of a projection image inputted from an external terminal; and
   a light modulation display panel to display the projection image processed by the signal processor and modulate light from the light source in accordance with the displayed projection image,
   wherein the controller controls the light modulation display panel to display a black image to execute the protective action.

5. The image projection apparatus of claim 1, wherein the controller switches off the light source when executing the protective action or makes power of the light source a predetermined value or less when executing the protective action.

6. The image projection apparatus of claim 1, further comprising an audio output device,
   wherein the controller controls the audio output device to output a sound to execute the protective action.

7. The image projection apparatus of claim 1, further comprising a timer to measure the time of continuous use of the projector, wherein the controller lowers the predetermined threshold value as the time of continuous use measured by the timer increases.

8. The image projection apparatus of claim 1, wherein the controller lowers the predetermined threshold value as the power of the light source increases.

9. An image projection apparatus, comprising:
   a light source;
   a projector to project light from the light source;
   a dust-proof member to protect the projector from outside dust while transmitting the light from the light source through the dust-proof member;
   a light detector provided at an end surface of the dust-proof member to detect reflected light of light projected from the projector, the reflected light being internally reflected light trapped within the dust-proof member; and
   a controller that executes a protective action when the amount of internally reflected light detected by the light detector meets or exceeds a predetermined threshold value, the image projection apparatus further including:
   a signal processor to process signals of a projection image inputted from an external terminal; and
   a light modulation display panel to display the projection image processed by the signal processor and modulate light from the light source in accordance with the displayed projection image,
   wherein the controller changes the predetermined threshold value according to properties of the projection image.

10. An image projection apparatus, comprising:
    a light source;
    a projector to project light from the light source;
    a dust-proof member to protect the projector from outside dust while transmitting the light from the light source through the dust-proof member;
    a light detector provided at an end surface of the dust-proof member to detect reflected light of light projected from the projector, the reflected light being internally reflected light trapped within the dust-proof member; and
    a controller that executes a protective action when the amount of internally reflected light detected by the light detector meets or exceeds a predetermined threshold value, the image projection apparatus further including an outside light detector to detect an outside luminous energy,
    wherein the controller changes the predetermined threshold value according to the detected outside luminous energy.

11. The image projection apparatus of claim 10, wherein the controller raises the predetermined threshold value as the detected outside luminous energy increases.

* * * * *